United States Patent
Kluftinger et al.

(10) Patent No.: US 12,072,347 B2
(45) Date of Patent: Aug. 27, 2024

(54) VEHICLE ROTATIONAL SPEED SENSOR AND METHOD FOR PRODUCING SAME

(71) Applicant: KNORR-BREMSE Systeme fuer Nutzfahrzeuge GmbH, Munich (DE)

(72) Inventors: Andre Kluftinger, Kleinheubach (DE); Gerhard Wieder, Besigheim (DE); Klaus Lechner, Pretzfeld (DE); Pravin Jawarikar, Khamgaon (IN); Karl-Heinz Schmid, Besigheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 271 days.

(21) Appl. No.: 17/640,744

(22) PCT Filed: Aug. 25, 2020

(86) PCT No.: PCT/EP2020/073688
§ 371 (c)(1),
(2) Date: Mar. 4, 2022

(87) PCT Pub. No.: WO2021/043619
PCT Pub. Date: Mar. 11, 2021

(65) Prior Publication Data
US 2022/0317141 A1     Oct. 6, 2022

(30) Foreign Application Priority Data
Sep. 6, 2019 (DE) .................. 10 2019 123 991.5

(51) Int. Cl.
*G01P 1/02*    (2006.01)
*G01P 1/00*    (2006.01)

(52) U.S. Cl.
CPC ............ *G01P 1/026* (2013.01); *G01P 1/06* (2013.01)

(58) Field of Classification Search
CPC ..... G01D 5/24438; G01P 3/443; G01P 3/488; G01P 3/489; G01R 33/18
See application file for complete search history.

(56) References Cited

U.S. PATENT DOCUMENTS

| 6,334,361 B1 | 1/2002 | De Volder et al. |
| 2007/0161268 A1 | 7/2007 | Muschketat |

(Continued)

FOREIGN PATENT DOCUMENTS

| CN | 103715646 A | 4/2014 |
| CN | 104181662 A | 12/2014 |

(Continued)

OTHER PUBLICATIONS

Chinese-language Office Action issued in Chinese Application No. 202080062161.7 dated Mar. 24, 2023 with English translation (14 pages).

(Continued)

*Primary Examiner* — Tung X Nguyen
(74) *Attorney, Agent, or Firm* — Crowell & Moring LLP

(57) ABSTRACT

A vehicle rotational speed sensor has a sensor element, a cylindrical sensor housing in which the sensor element is accommodated, an electrical connection cable which is guided out of the sensor housing, and a bend limiting element. The bend limiting element is configured to limit a radius of curvature of the connection cable directly in a region in which the connection cable is guided out of the cylindrical sensor housing.

5 Claims, 3 Drawing Sheets

(56) References Cited

U.S. PATENT DOCUMENTS

| | | |
|---|---|---|
| 2014/0093247 A1 | 4/2014 | Jamtveit et al. |
| 2014/0165726 A1 | 6/2014 | Boro et al. |
| 2016/0087372 A1 | 3/2016 | Baba et al. |
| 2016/0282577 A1 | 9/2016 | Chang |

FOREIGN PATENT DOCUMENTS

| | | | |
|---|---|---|---|
| CN | 108459381 A | 8/2018 | |
| DE | 91 08 387 U1 | 11/1992 | |
| DE | 19612765 A1 | 11/1997 | |
| DE | 202005014666 U1 * | 2/2006 | ........... G01D 11/245 |
| DE | 10 2004 060 297 A1 | 6/2006 | |
| DE | 10 2006 001 290 C5 | 8/2009 | |
| DE | 10 2009 046 439 A1 | 5/2011 | |
| DE | 10 2017 007 399 A1 | 2/2019 | |
| EP | 3 070 439 A1 | 9/2016 | |
| JP | 51-25978 U | 8/1974 | |
| JP | 1-238839 A | 9/1989 | |
| JP | 2-227973 A | 9/1990 | |
| JP | 5-23018 U | 3/1993 | |
| JP | 2002-357404 A | 12/2002 | |
| JP | 2002-365305 A | 12/2002 | |
| JP | 2006-78222 A | 3/2006 | |
| JP | 2014-178221 A | 9/2014 | |
| JP | 2018-128322 A | 8/2018 | |
| WO | WO 2009/071390 A2 | 6/2009 | |

OTHER PUBLICATIONS

Hindi-language Office Action issued in Hindu Application No. 202237011170 dated Jul. 20, 2022 with English translation (six (6) pages).

Japanese-language Office Action issued in Japanese Application No. 2022-514780 dated Nov. 15, 2023 with English translation (8 pages).

International Preliminary Report on Patentability (PCT/IB/326 & PCT/IB/373) issued in PCT Application No. PCT/EP2020/073688 dated Mar. 17, 2022, including English translation of document C2 (Japanese-language Written Opinion (PCT/ISA/237) filed on Mar. 4, 2022) (eight (8) pages).

International Search Report (PCT/ISA/210) issued in PCT Application No. PCT/EP2020/073688 dated Nov. 30, 2020 with English translation (four (4) pages).

German-language Written Opinion (PCT/ISA/237) issued in PCT Application No. PCT/EP2020/073688 dated Nov. 30, 2020 (six (6) pages).

German-language Office Action issued in German Application No. 10 2019 123 991.5 dated May 6, 2020 (10 pages).

Japanese-language Office Action issued in Japanese Application No. 2022-514780 dated Apr. 12, 2023 with English translation (14 pages).

Chinese-language Office Action issued in Chinese Application No. 202080062161.7 dated Mar. 21, 2024 with English translation (17 pages).

* cited by examiner

VEHICLE ROTATIONAL SPEED SENSOR AND METHOD FOR PRODUCING SAME

BACKGROUND AND SUMMARY

The present invention relates to a vehicle rotational speed sensor, in particular for commercial vehicles, to a method for producing same, and in particular to a short axial rotational speed sensor with a guided cable outlet.

Conventional rotational speed sensors are generally used in two sensor variants: (i) in axial head form as an I-shaped or rod-shaped sensor, or (ii) in radial head form, in which the cable outlet is at an angle of 90° relative to the sensor head so that an L-shaped sensor is produced. The structural form used is given by the installation situation, or the desired path of a cable guide.

A disadvantage of these conventional rotational speed sensors is that the cable has to be guided meticulously along the axis, or away from the sensor. The requirement arises from the particular applications for ensuring correct operation. For example, in conventional rotational speed sensors it is not possible to adapt the sensor element with respect to the magnet wheel. In particular when newer sensor elements (e.g. magnetoresistive sensor elements) are to be used, the orientation is important, so that the mentioned limitations are often unacceptable.

There is therefore a need for further vehicle rotational speed sensors which allow more freedom in terms of use but at the same time do not necessitate any limitation in terms of installation space.

At least part of the above-mentioned problems is solved by a vehicle rotational speed sensor or by a method for the production thereof, in accordance with the independent claims. The dependent claims define further advantageous embodiments of the subject matter of the independent claims.

The present invention relates to a vehicle rotational speed sensor having a sensor element, a cylindrical sensor housing in which the sensor element is accommodated or embedded, an electrical connection cable which is guided out of the sensor housing, and a bend limiting element. The bend limiting element is configured to limit a radius of curvature of the connection cable directly in a region in which the connection cable is guided out of the cylindrical housing.

Optionally, the bend limiting element limits the radius of curvature by both a maximum value and/or a minimum value. Guiding of the connection cable in a desired (preferential) direction is thereby possible.

The sensor element can be at least partially embedded in a plastics material (e.g. an overmolding compound or potting compound) and the bend limiting element can be produced as a molded-on part from an identical material to the plastics material or from a different material. The plastics material itself can form the sensor housing or can be formed inside a (metal) sheath, which can be part of the sensor housing. The sensor element can be overmolded with an overmolding compound.

Optionally, the bend limiting element can be in the form of one of the following:
an insert part in the overmolding tool,
a molded-on part on the connection cable,
a molded-on part on the sensor or sensor housing,
a clip or cover,
an attachment part.

An advantage of the first three options is the secure hold, for example under mechanical stress. An advantage of the last two options is that the bend limiting element can also be applied or clipped onto the connection cable retrospectively.

Optionally, the bend limiting element comprises plates or extends in a trumpet-like manner around the connection cable.

Optionally, the bend limiting element is configured to prevent the connection cable from being guided out parallel to the axial axis of the cylindrical sensor housing, or at least to make this more difficult. For example, it can form a friction-based bond (e.g. via pretensioning) with the connection cable, so that it provides additional protection against mechanical loosening of the connection cable or loosening by vibrations.

Exemplary embodiments relate to a method for producing the vehicle rotational speed sensor (e.g. as has been defined hereinbefore). The method comprises:
providing a sensor element;
forming a cylindrical sensor housing in which the sensor element is at least partially embedded;
forming an electrical connection cable which is guided out of the sensor housing;
forming a bend limiting element in order to limit a radius of curvature of the connection cable in a region in which the cable is guided out of the cylindrical housing.

Optionally, forming the cylindrical sensor housing comprises a step of overmolding, in which the bend limiting element is inserted at least partially into the overmolding tool. It can thereby be fixedly connected to the sensor housing.

Forming the bend limiting element can also comprise molding onto the connection cable or onto the sensor housing.

Optionally, forming the bend limiting element can also comprise clipping or engaging the bend limiting element around the connection cable.

It will be appreciated that the sequence of the method steps is essential only inasmuch as it is essential for the desired effect. Otherwise, the method steps can be carried out in any desired sequence.

The mentioned exemplary embodiments offer the advantage that the sensor housing can be formed in a shortened manner, so that different cable outlet directions are possible. Sensor elements which require a specific direction for sensor signal detection (e.g. based on magnetoresistive effects, such as Hall, GMR, TMR, AMR sensors) can thus advantageously be used, since the cable outlet does not define any direction. Exemplary embodiments limit only the radius of curvature but not the direction/angle in which the connection cable is bent as it is guided out. An advantageous cable routing or cable guide away from the sensor element can therefore be freely chosen. The variance of different conventional rotational speed sensors is thus reduced. In addition, the outlet radius can be freely chosen, up to a limit that is defined by the bend limiting element, so that the cable can be guided away at (almost) any angle.

The exemplary embodiments of the present invention will be better understood from the following detailed description and the accompanying drawings of the various exemplary embodiments, which, however, are not to be interpreted as limiting the disclosure to the specific embodiments but serve merely for explanation and understanding.

DETAILED DESCRIPTION OF THE DRAWINGS

Figure 1:
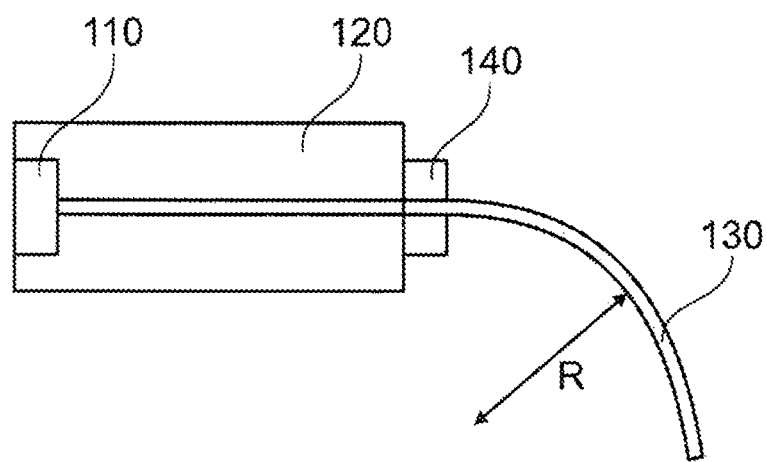
FIG. 1 shows a rotational speed sensor according to an exemplary embodiment of the present invention.

FIG. 1 shows a vehicle rotational speed sensor, which can be used in particular for commercial vehicles. According to one exemplary embodiment, the vehicle rotational speed sensor comprises a sensor element 110, a cylindrical sensor housing 120 in which the sensor element 110 is accommodated, and an electrical connection cable 130 which is guided out of the sensor housing 120. The vehicle rotational speed sensor additionally comprises a bend limiting element 140 which is configured to limit a radius of curvature R of the connection cable 130 directly in a region in which the connection cable 130 is guided out of the cylindrical sensor housing 120.

The sensor housing 120 can be in single-part or multi-part form, for example. Thus, the sensor housing 120 can comprise, for example, an outer metal sleeve (e.g. of non-magnetizable material) and an overmolding compound formed therein, into which the sensor element 110 can be at least partially embedded or which at least provides hold. It is likewise possible that the sensor housing 120 holds the sensor element 110 in a desired position and/or in a desired orientation relative to the sensor housing 120. This orientation can be indicated by an optional marking which is visible from the outside, so that correct installation can be ensured.

The bend limiting element 140 can be connected directly to the exemplary overmolding compound or potting compound within the sensor housing 120 and comprise an identical or similar material. Optionally, it is likewise possible that the bend limiting element 140 comprises a different material. It is further possible that the bend limiting element 140 is inserted as an insert part in the overmolding tool during formation of the sensor housing 120 or of the overmolding compound within an outer metal sleeve, so that it is fixedly connected to the sensor housing 120 during the overmolding process.

The bend limiting element 140 can, for example, limit the radius of curvature R on guiding out of the sensor housing 120 within a range that is defined by a minimum value (e.g. 20 mm or 25 mm) and a maximum value (50 mm or 100 mm). It is likewise possible that the bend limiting element 140 limits the radius of curvature R only downward (i.e. only the maximum curvature/bend of the cable) and it continues to be possible to guide the connection cable 130 axially out of the sensor housing 120 in a wire-like manner. The sensor housing 120 can have a diameter in a range between 10 mm and 30 mm (or about 16 mm), for example. However, it can also have other dimensions.

Figure 2:
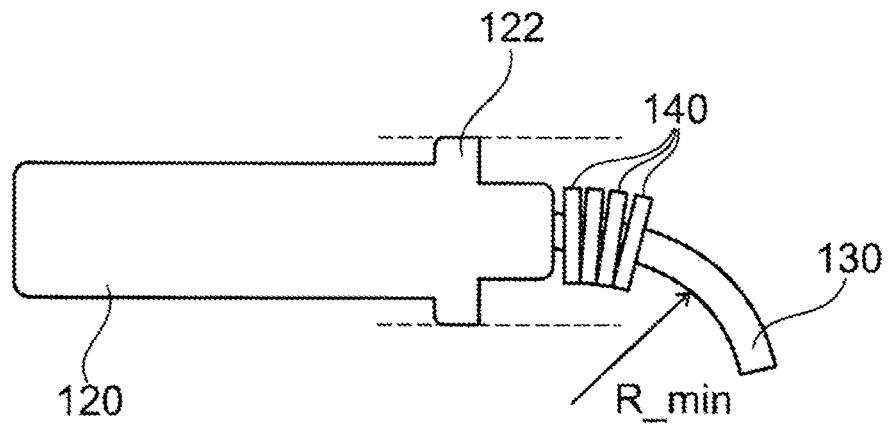
FIG. 2 shows an embodiment of the bend limiting element.

FIG. 2 shows an exemplary embodiment of the bend limiting element 140 in the form of a plurality of plates which extend around the connection cable 130 and are formed in the region in which the connection cable 130 is guided out of the sensor housing 120. The plates can be fixedly connected (by interlocking or frictional engagement) to the sensor housing 120 (e.g. to the overmolding compound), for example. However, the plates can also be in the form of clips or attachment elements which are fitted to the connection cable 130 after the sensor housing 120 with the cable 130 has been formed. They also do not necessarily have to be fixedly connected to the sensor housing 120. It is important that they limit the curvature of the connection cable 130.

In the exemplary embodiment shown in FIG. 2, the sensor housing 120 comprises a collar 122, which provides a stop on insertion of the rotational speed sensor. This collar 122 extends further radially outward than the remainder of the sensor housing 120 by, for example, 4 mm . . . 10 mm (or approx. 6 mm).

The plurality of plates for the bend limiting element 140 can be formed, for example, such that the connection cable 130 can be guided out of the sensor housing 120 only in a range, that is to say defined by a minimum value and a maximum value, for the radius of curvature R. This can be achieved, for example, in that the individual plates are connected together and are not freely rotatable relative to one another, and the plates in one region (e.g. at the top in FIG. 2) are thicker than the plates in an opposite region (e.g. at the bottom in FIG. 2).

Figure 3:
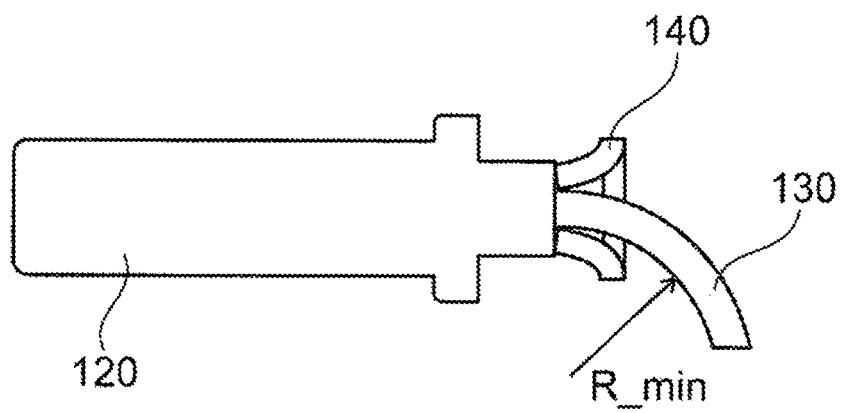
FIG. 3 shows a further embodiment of the bend limiting element.

FIG. 3 shows a further exemplary embodiment which differs from the exemplary embodiment of FIG. 2 only in that the bend limiting element 140 is in the form of a trumpet-shaped widened portion at the end of the sensor housing 120. In particular in this exemplary embodiment, it is possible that the bend limiting element 140 is formed together with an exemplary overmolding compound of the sensor housing 120 or as part thereof. The bend limiting element 140 shown in FIG. 3 is configured to limit the radius of curvature R downward, but not in respect of a maximum value. Accordingly, in the exemplary embodiment of FIG. 3, the connection cable 130 can be guided out parallel to the axial axis of the sensor housing 120 of cylindrical form.

Figure 4:
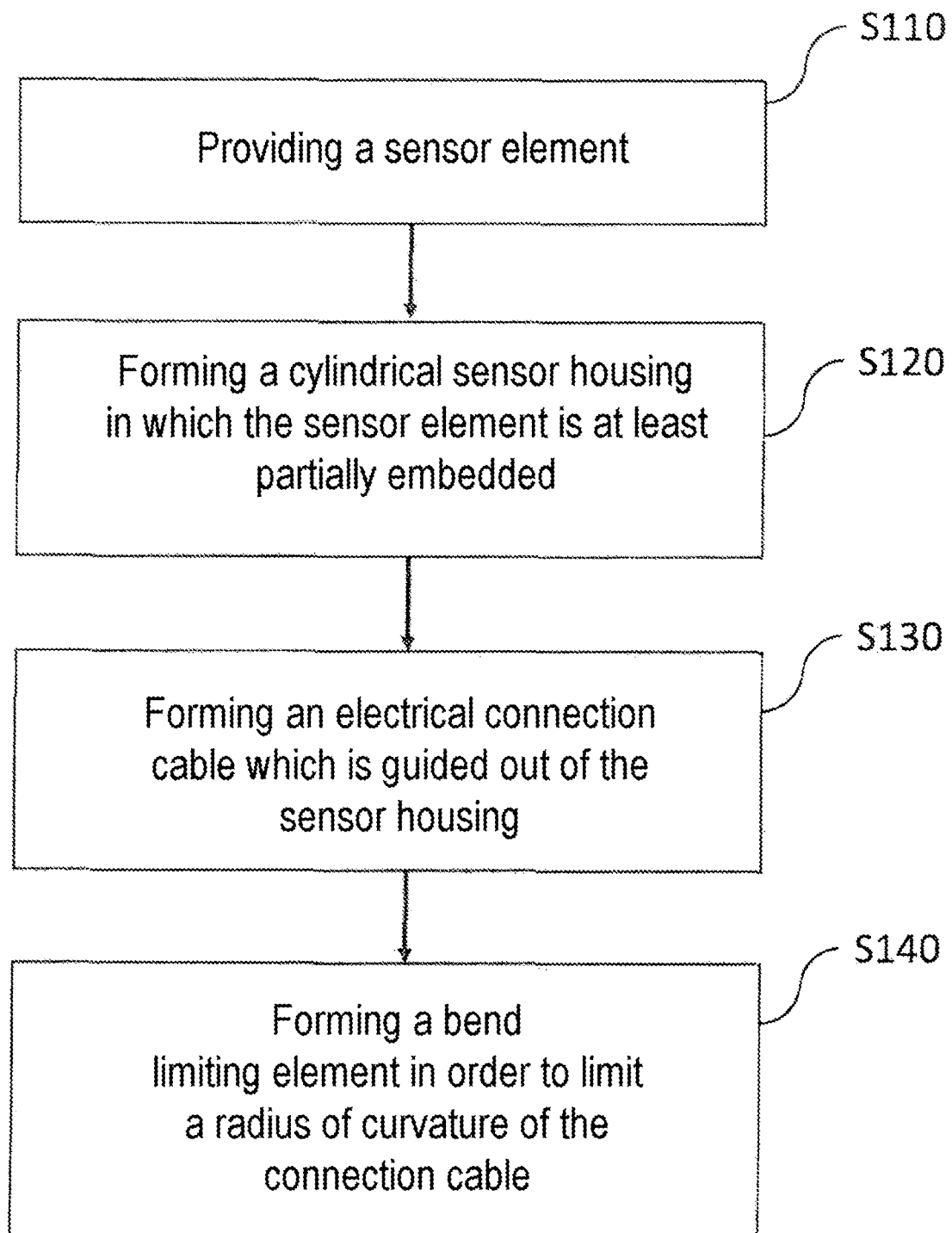
FIG. 4 shows a flow diagram of a method for producing the rotational speed sensor according to a further exemplary embodiment.

FIG. 4 shows a flow diagram of a method for producing a vehicle rotational speed sensor. The method comprises:
providing S110 a sensor element 110;
forming S120 a cylindrical sensor housing 120 in which the sensor element 110 is at least partially embedded;
forming S130 an electrical connection cable 130 which is guided out of the sensor housing 120;
forming S140 a bend limiting element 140 in order to limit a radius of curvature R of the connection cable 130 in a region in which the cable is guided out of the cylindrical housing 120.

In particular, the method comprises an overmolding process, wherein the bend limiting element 140 is formed during overmolding or is inserted as an insert part into the overmolding tool and thus fixedly connected to the sensor housing 120.

The vehicle rotational speed sensors so produced allow both cable routing positions (axial or radial) to be implemented with only one form of sensor. This is a considerable advantage over conventional rotational speed sensors. This advantage is achieved by the limiting element 140 for the cable bend R, in order thus to make possible a mechanical stop in both installation positions. According to exemplary embodiments, the bend limiting element 140 is designed in particular to prevent the cable from being squeezed or from kinking at the cable outlet. This is achieved in that the radius must not and cannot be below a minimum bending radius.

In summary, the bend limiting element 140 can be configured inter alia as follows:
as a molded-on part of the same material as the sensor housing 120 or as the overmolding compound in a metallic sheath;
comprise a two-component material;
as an insert part in the tool (e.g. overmolding tool);
as a part already molded onto the connection cable 130;

equipped with a clip function.

Further advantages of exemplary embodiments arise because, in each vehicle rotational speed sensor having the bend limiting element 140, protection against the cable becoming detached by vibration is achieved directly at the sensor head. In addition, limiting the bending radius of the cable to an adjustable maximum radius allows the cable to be relieved of tensile force at the sensor.

Exemplary embodiments of the bend limiting element 140 can—as stated—comprise in particular plates or honeycombs. However, the invention is not to be limited to the specific form of the bend limiting element 140. Rather, other forms are likewise conceivable. Forms from structural bionics (e.g. honeycombs, sandwich structure) which have elements which can be compressed and extended can especially be used.

A particular advantage of exemplary embodiments arises because the vehicle rotational speed sensor with the bend limiting element 140 can be made shorter. And despite the short form, it is possible to carry out cable routing at the axial axis in the same form as in the radial sensor variants used hitherto.

The features of the invention that have been disclosed in the description, the claims and the figures can be essential to the implementation of the invention both individually and in any desired combination.

LIST OF REFERENCE SIGNS

110 sensor element
120 cylindrical sensor housing
122 collar of the sensor housing
130 connection cable
140 bend limiting element
R radius of curvature

The invention claimed is:

1. A vehicle rotational speed sensor, comprising:
   a sensor element embedded at least partially in a plastics material;
   a cylindrical sensor housing in which the sensor element is accommodated;
   an electrical connection cable which is guided out of the sensor housing; and
   a bend limiting element which is configured to limit a radius of curvature of the connection cable directly in a region in which the connection cable is guided out of the cylindrical sensor housing, wherein the bend limiting element is a molded-on part of an identical material to the plastics material and extends in a trumpet-shaped manner around the connection cable.

2. The vehicle rotational speed sensor as claimed in claim 1, wherein
   the bend limiting element limits the radius of curvature by a maximum value or a minimum value.

3. The vehicle rotational speed sensor as claimed in claim 1, wherein
   the bend limiting element limits the radius of curvature by both a maximum value and a minimum value.

4. The vehicle rotational speed sensor as claimed in claim 1, wherein
   the bend limiting element is configured to prevent or inhibit the connection cable from being guided out parallel to an axial axis of the cylindrical sensor housing.

5. A method for producing a vehicle rotational speed sensor, comprising:
   providing a sensor element;
   forming a cylindrical sensor housing in which the sensor element is at least partially embedded;
   forming an electrical connection cable which is guided out of the sensor housing;
   forming a bend limiting element in order to limit a radius of curvature of the connection cable in a region in which the cable is guided out of the cylindrical sensor housing,
   wherein forming the cylindrical sensor housing comprises overmolding, in which the bend limiting element is inserted at least partially into an overmolding tool, and wherein forming the bend limiting element comprises molding onto the sensor housing in a trumpet-shaped manner around the connection cable.

* * * * *